United States Patent [19]

Lavanchy et al.

[11] 4,217,053

[45] Aug. 12, 1980

[54] APPARATUS AND METHOD TO TEST WORKPIECES FOR SIZE, RELATIVE POSITION, MATERIAL INTEGRITY, AND THE LIKE

[75] Inventors: Jean-Pierre Lavanchy, Apples; Frieder Heizmann, Monnaz, both of Switzerland

[73] Assignee: Robert Bosch GmbH, Stuttgart, Fed. Rep. of Germany

[21] Appl. No.: 897,037

[22] Filed: Apr. 17, 1978

[30] Foreign Application Priority Data

Apr. 20, 1977 [DE] Fed. Rep. of Germany ....... 2717507

[51] Int. Cl.$^2$ ........................ G01B 11/00; G01B 11/04
[52] U.S. Cl. .................................. 356/372; 250/224; 356/387
[58] Field of Search ............................... 356/385–387, 356/383, 380, 372; 250/224, 223 R, 223 B, 559–563, 571–572

[56] References Cited

U.S. PATENT DOCUMENTS

| | | |
|---|---|---|
| 2,812,685 | 11/1957 | Vossberg ............................ 356/387 |
| 3,782,834 | 1/1974 | Fujimori et al. ..................... 250/560 |
| 3,803,474 | 4/1974 | Clarke ................................. 250/562 |
| 3,905,705 | 9/1975 | Petrohilos ........................... 356/387 |
| 4,007,992 | 2/1977 | Petrohilos et al. .................. 356/387 |
| 4,063,820 | 12/1977 | Borgese ........................... 250/223 R |

*Primary Examiner*—John K. Corbin
*Assistant Examiner*—Wm. H. Punter
*Attorney, Agent, or Firm*—Frishauf, Holtz, Goodman & Woodward

[57] ABSTRACT

A workpiece is passed through a beam of either continuous or pulsed light which is interrupted thereby. The light impinges on a phototransducer such as a phototransistor, which is connected to an evaluation circuit. The evaluation circuit evaluates instantaneous light values with respect to movement of the workpieces in the beam, that is, evaluates variations derived from the transducer which preferably are decoded with respect to threshold levels and the time between sequential level exceeding, or passing, the thresholds is sensed, for example by a counter, to provide an output representative of the occurrence of changes in the light values indicative, for example, of discontinuities in the workpiece.

16 Claims, 9 Drawing Figures ic
APPARATUS AND METHOD TO TEST WORKPIECES FOR SIZE, RELATIVE POSITION, MATERIAL INTEGRITY, AND THE LIKE The present invention relates to method and apparatus to test workpieces for size, relative position, material integrity, and the like, and more particularly to an optical test apparatus in which a workpiece is irradiated by a beam of light and the shadow image of the workpiece is used as a basis for the test.

BACKGROUND AND PRIOR ART

Various optical test apparatus are known in which a workpiece is placed between a light source and a light sensitive sensor. Usually, a diaphragm is interposed between the light source and the workpiece. This diaphragm customarily has the shape of the workpiece so that the beam of light irradiating the workpiece fits the outlined shape of a correct workpiece. If the workpiece fits this shape, then the sensor receives practically no light, since it will be entirely within the shadow of the workpiece. This identifies the workpiece, or its position, and discontinuities which permit the passage of light will also cause excess light to be received by the receiver. If the contour of the workpiece does not fit the outline of the beam of light, as masked by the diaphragm, then a defective or improper workpiece has been identified. Such arrangements have the disadvantage that each specific type of workpiece requires a special mask or diaphragm which must be exchanged for placement in the beam path if different workpieces are to be tested. Additionally, the alignment of the workpiece with respect to the mask must be highly accurate, in two axial directions, in order to prevent erroneous output indications. These, otherwise simple, testing arrangements also cannot readily decode or indicate small changes from a standard workpiece, for example a chamfer at one side of a corner.

THE INVENTION

It is an object of the invention to permit utilization of an optical recognition system which permits use of a diaphragm or a beam of light independent of the contour of the workpiece, and on which small deviations from a standard size can be recognized.

Briefly, a diaphragm is provided located between a source, for example a light emitting diode (LED), and a phototransducer, and shaped to provide a beam of simple geometric form. The electrical transducer, for example a phototransistor, is connected to an evaluation circuit which includes a response means responding to instantaneous light values received by the transducer as a workpiece is guided through the beam, and providing output signals which can be evaluated with respect to the movement of the workpiece through the beam. Preferably, the output signals are decoded with respect to one or two threshold values, and the elapsed time between passage of the output signals across the threshold levels is determined, for example in an integrating circuit, by a counter, or the like. In accordance with a preferred feature of the invention, the timing is determined by a bidirectional counter which first counts in one direction and then, upon passage of the signal through the threshold again, in the other direction, until the workpiece has passed through the beam. The difference count thus obtained can be used as a measure of the position of identations or other characteristics of the workpiece and, if it deviates from a predetermined value, as an indication of additional sensed light changes, for example indicative of faults, or the like.

The method and the system permit use of a diaphragm projecting a beam on the workpiece which is independent on its contour so that change-over or adjustment of the system to fit the different types of elements is not necessary. The light levels being evaluated can be sensed with respect to small pulse differences, and thus differences in the workpiece and deviation of workpieces from standards can be recognized. It is also possible to test for portions of workpieces, or for certain dimensions only.

Use of a counter is particularly suitable since it can readily be constructed in integrated circuit form, particularly in combination with threshold circuits. Utilization of a bidirectional counter and basing an output result on a difference has the advantage that the system becomes essentially independent of speed of the conveyor arrangement moving the workpieces past the testing station.

The counter may either count pulses delivered by a clock, or, preferably, if the light emitted by the source is pulsed, the counter counts light pulses reaching the transducer, for example, between successive passages across the thresholds.

A pulsed light source bears the additional advantage, that the influence of stray light due to extraneous light sources can readily be eliminated, for example, by a synchronous detector in the first stages of the evaluation circuits.

DRAWINGS

Illustrating a preferred example:

Figure 1:
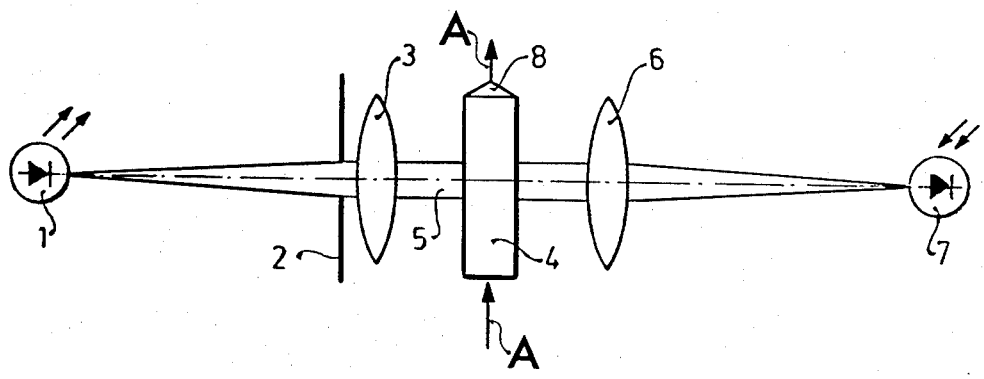
FIG. 1 is a highly schematic arrangement to test workpieces.

A light source 1 (FIG. 1) which, preferably, is an LED or a laser diode, generates and projects a pulsed beam of light through a diaphragm 2 and through a lens 3 to a workpiece 4. Although in a preferred mode the beam of light is pulsed and since the usually adopted pulse frequency is high as compared to other signal changes, throughout the following description the light emitted may be considered continuous unless otherwise noted. The workpiece 4 is moved by conveyor means, not shown, which can be in accordance with any well-known standard conveyor means, in the path of the arrows A through the beam 5. The shadow of the workpiece 4 and the remainder of the light passing alongside the workpiece 4 are projected through lens 6 on a phototransducer 7 which, preferably, is a photodiode or phototransistor. Other light sources than LED's or laser diodes can be used, and the sensor 7 can be any suitable phototransducer. In many instances the lens 3 or the lens 6 or both lenses are unessential and may be eliminated. The diaphragm 2 may be located anywhere in the lightpath between the light source 1 and the transducer 7 but, in the interest of a higher precision, the diaphragm should be located as far away as feasible from the light source 1 and from the transducer 7. The output from the photo-electric transducer 7 is connected to an evaluation circuit which is shown in detail in FIG. 3. The evaluation circuit includes a connecting line 21, a threshold stage 22, a connection line 23 to an amplifier 24, and a connection line 25 to an evaluation stage 26 which is connected to an output 27. The evaluation stage 26 provides an evaluation of output signals with respect to movement of the workpiece through the beam 5, that is, provides for time evaluation. Basically, the evaluation stage includes integrators which can operate either in analog form, that is, as a classic integration circuit using an R/C circuit, an operational amplifier connected as an integrator, or the like; or a counter which counts pulses applied in timed sequence.

The beam of light 5 has a simple geometric form; by a simple geometric form is meant a geometric shape which is used in many photo testing devices, that is, not matched to a specific contour. In the present example, the simple geometric form is a narrow sheet-form beam, generated by a slit diaphragm —see also FIG. 6 in which two slit diaphragms 63, 63' are shown. crossed with respect to each other.

The method and apparatus can be used to test workpieces for position, size, shape, or material defects, as well as to recognize workpieces with respect to their shape, for example. The arrangement and method to test workpieces for position will be described first.

Figure 3:
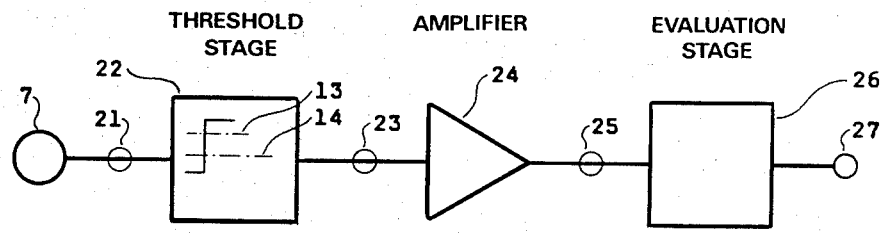
FIG. 3 is a schematic diagram of the overall evaluation system.
Figure 2A:
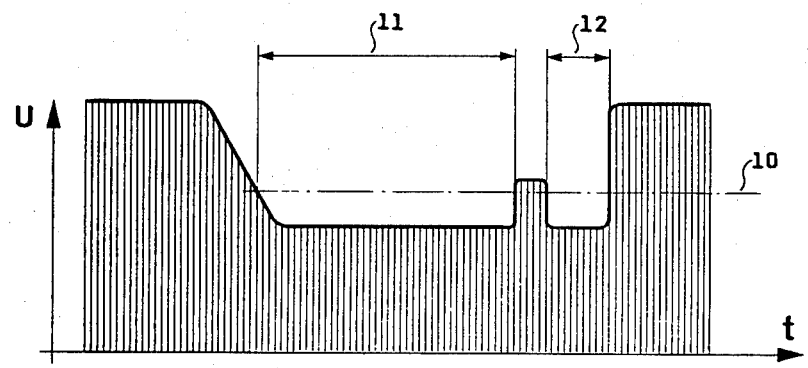
FIGS. 2a and 2b are is a graphic representations of pulses utilized to explain the operation of the apparatus.
Figure 2B:
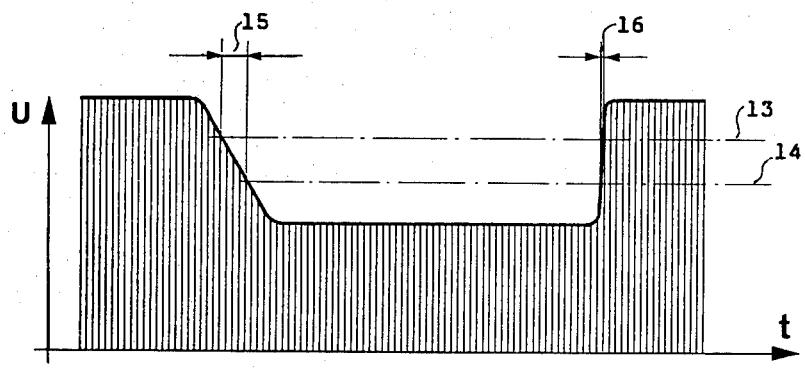
Figure 4:
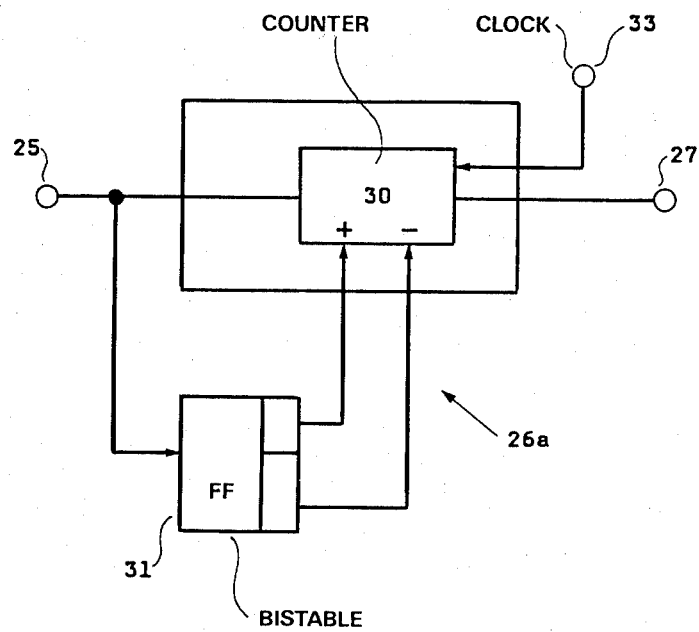
FIG. 4 is a schematic diagram of one embodiment of an evaluation stage.

The workpiece 4 is formed with a chamfer 8 at one side thereof. It is conducted through the beam 5 which, by means of a vertical slit diaphragm 2, provides a narrow vertical sheet of light. The photodiode 7 will receive a signal as illustrated in FIGS. 2a and 2b, in which, for example, the absence of a signal indicates that no light energy is applied to the transducer 7 and presence of a signal from the transducer 7 that, at least little, light reaches the transducer 7. It is here assumed that the workpiece is essentially opaque. If the workpiece 4 is formed with a notch, which may be a desired notch in a predetermined position, or which may be due to defects, then a signal as shown in graph a of FIG. 2a will be derived. Such an arrangement permits a particularly simple evaluation. The threshold stage 22, connected to the transducer 7, will connect a counter 30 (FIG. 4) in evaluation stage 26 to start counting when a first threshold level 10 (FIG. 2a) which, for example, may correspond to the threshold level 13 indicated in FIG. 3, is reached, providing a signal on lead 25, that will cause lead 25 to be energized. The counter 30 has a clock signal applied at clock terminal 33. The counter 30 is enabled to count whenever the signal at line 25 is a 1-signal, that is, is "high", that is, if the transducer 7 signal is below the threshold level 10. This signal will also set a bistable flip-flop (FF) 31, a positive output of which will cause a 1-signal to appear at the plus or forward count control input terminal of the counter 30. Consequently, counter 30 will count upwardly at the rate of the clock signal applied to terminal 33. The counter will count until the notch in the workpiece is sensed. The count state will be a measure for the dimension of the workpiece up to the notch, which is graphically illustrated by the dimension 11 in FIG. 2. The next time when the threshold is again reached, the FF 31 will be retriggered to be reset, the polarities will reverse, and the counter 30 will have a 1-signal appear at the negative or reverse count input. The counter 30 will then count down at the rate of the clock pulses applied to terminal 33 for the duration of the signal applied to terminal 25, representative of the length 12, until the threshold level is again passed. The count state at the end of the test, which is read out at terminal 27, will be the difference between the representative distances 11, 12. This difference provides for an unambiguous indication of the position of the notch and, hence, if the notch is predetermined, for the position of the workpiece 4. If the count state is greater than zero, then the notch will be beyond the halfway length of the workpiece; If it is less than zero, it will be at the forward portion of the workpiece. The count number, and the sign of the count thus permits an accurate evaluation of the presence of the notch and its position with respect to the workpiece, or the position of the workpiece itself with respect to the beam of light. By forming a difference, it is additionally not necessary that the speed of movement of all workpieces, as represented by the arrows A (FIG. 1), be the same. It is only necessary that the speed of passage of any workpiece through the beam be essentially constant.

The apparatus and the method are also suitable to test for accuracy of size and shape, and to provide output indications representative of defects. If the transport speed is constant or uniform, then the count state is, simultaneously, representative of the distance between the limit dimensions of the workpiece and the notch, as represented by the threshold level. This, then, provides an output indication regarding size of the workpiece. Defects can be sensed by different count states, for example deviation of the count state from a standard value could indicate misplacement of the notch, excessive or undersize thereof, or undersired fissures. It is usually possible to test, simultaneously, for size as well as defects in this manner. By suitable selection of the threshold level, which can vary between zero and a maximum value, various test steps can be arranged while utilizing the same apparatus.

If the workpiece does not have a notch formed therein but, rather, has a chamfered edge surface or an inclined end surface, then the method illustrated in connection with the graph of FIG. 2b is applicable. FIG. 2b illustrates the output signal from the phototransducer 7 if a workpiece with an inclined leading edge and an inclined trailing edge which, however, is steeper than the leading edge, is passed through the beam 5. Both threshold levels of threshold stage 22 will now be utilized. Threshold stage 22 has two threshold levels 13, 14 (FIG. 2b; FIG. 3). When the higher threshold level 13 is reached in descending direction, counter 30 is energized to count; when the second threshold level 14 is crossed, the counter stops counting. Control of the counter, again, can be carried out by an FF 31 which, to respond to two signals for one count direction, should have another FF serially connected thereto, so that both FF's will operate similar to a divide-by-two stage. The same effect can be obtained with a single FF, suitably connected. The count state which is thus stored will be representative of the slope, that is the steepness of the inclined chamfer or section 8. For positive identification it is desirable to also test the workpiece at the trailing edge, that is, when the lower threshold level 14 is passed in upward direction. The counter 30 will then be controlled to count down—as previously explained—by energization of the down-count terminal through FF 31. Down-counting is terminated when the upper threshold level 13 is reached. The portion of the chamfer at the trailing edge will have a length represented by 16 in graph b of FIG. 2. The position of the workpiece, again, can be determined in dependence on a positive or negative output from the counter. The counter, again, will form a difference. The speed of the workpiece through the apparatus should be uniform, but the speed of passage of different workpieces can well be different. If the test is also to be for absolute size, however, then all workpieces must operate at the same speed. Compensation for speed variation can be obtained by feeding a speed signal to the clock which controls the clock rate applied as a clock signal at terminal 33; or to provide a speed-responsive signal to terminal 43 (FIG. 5) if analog integration is used, as will appear.

By suitable selection of the thresholds of the threshold levels 13, 14, it is possible to analize various slopes or steepnesses of the chamfer or inclination of a wedge-shaped end portion 8, for example, by determination and analysis of the time representing the distances 15, 16. The trigger thresholds can easily be changed electrically in threshold circuits, and the number of trigger thresholds can also be easily set, for example by superimposing separate threshold circuits so that complex slopes can be analyzed.

Figure 5:
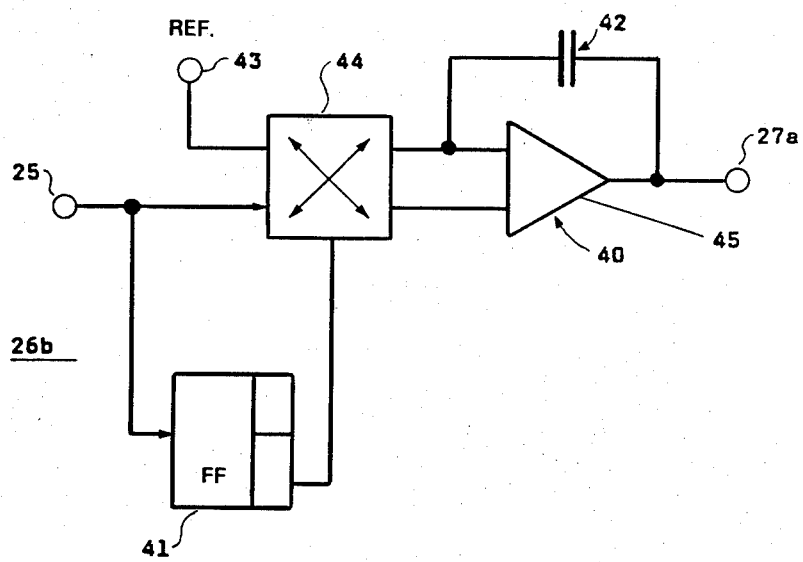
FIG. 5 is a schematic diagram of another embodiment of an evaluation stage.
Figure 6:
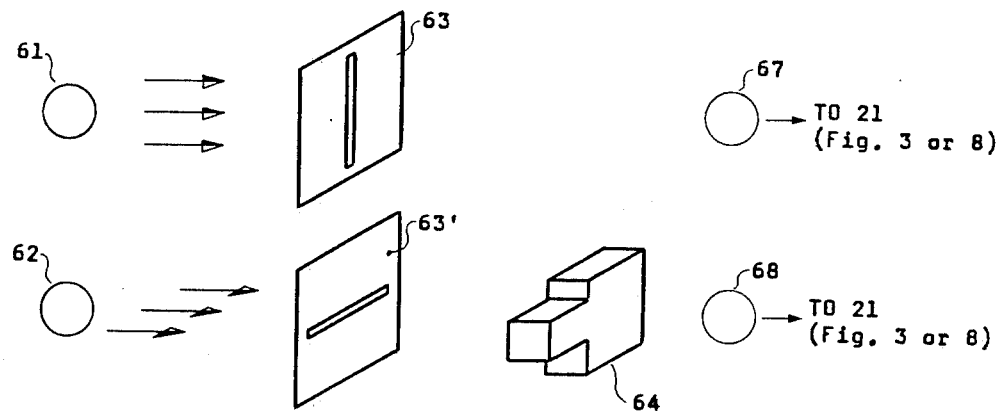
FIG. 6 shows a first combination system in which two beams of light are used to irradiate a workpiece in two crossed directions.

In a preferred form, counter 30 is used since counters (FIG. 4) are easily obtained electronic components which can be readily integrated. Clock rates at high accuracy and high rate can be obtained, thus permitting high resolution. For simple arrangements, however, and if the cost of counters is not warranted, the timing can be evaluated by analog integration. FIG. 5 illustrates an arrangement in which an analog evaluation stage 26b is connected to terminal 25. Terminal 25 is connected through a reversal switch 44 to an integrator 40, shown as an operational amplifier 45 which has a feedback capacitor 42. An R/C circuit could also be used. Upon occurrence of the first pulse on terminal 25, a reference voltage 43 is applied to the operational amplifier 45 to one terminal, for example the direct input, and the signal from terminal 25 to the other terminal, for example the inverting terminal of operational amplifier 45. At the next pulse, FF 41 provides an output to the reversal switch 44, reversing the polarity of the signals applied to the operational amplifier, so that it will then integrate in reverse direction during persistence of the signal at terminal 25 thus, again, forming a difference value Evaluation of the counter output, or of the analog output derived from the circuit of FIG. 5, for example, can be used to recognize different workpieces. If a plurality of light beams 5 are sequentially located, preferably rotated with respect to each other, different workpieces can readily be recognized and their position sensed. FIG. 6 shows two light sources 61, 62 arranged to project beams of light through diaphragm slits 63, 63' which are crossed with respect to each other, the respective beams being sensed by pick-ups 67, 68 which, each, are connected to evaluation circuits, for example similar to those explained in connection with FIG. 3. Whilst in FIG. 6 the straight line connecting the light source 61 with the transducer 67 is approximately parallel to the straight line connecting the source 62 with the transducer 68, FIG. 7, shows an arrangement where the corresponding lines, i.e, the straight line connecting the light source 71 with the transducer 77 and the straight line connecting the source 72 with the transducer 78 forms an angle of approximately 90°.

The drawing shows a workpiece 4 crossing sequentially the light beams 75 and 76. Of course, both sheets of light could be shifted into one single plane, in such a way, that the slits of the diaphragm 73 and 74, the light sources 71 and 72 as well as the transducers 77 and 78 would be in a same plane. In this latter disposition, the workpiece 4 would cross both light beams simultaneously.

Figure 7:
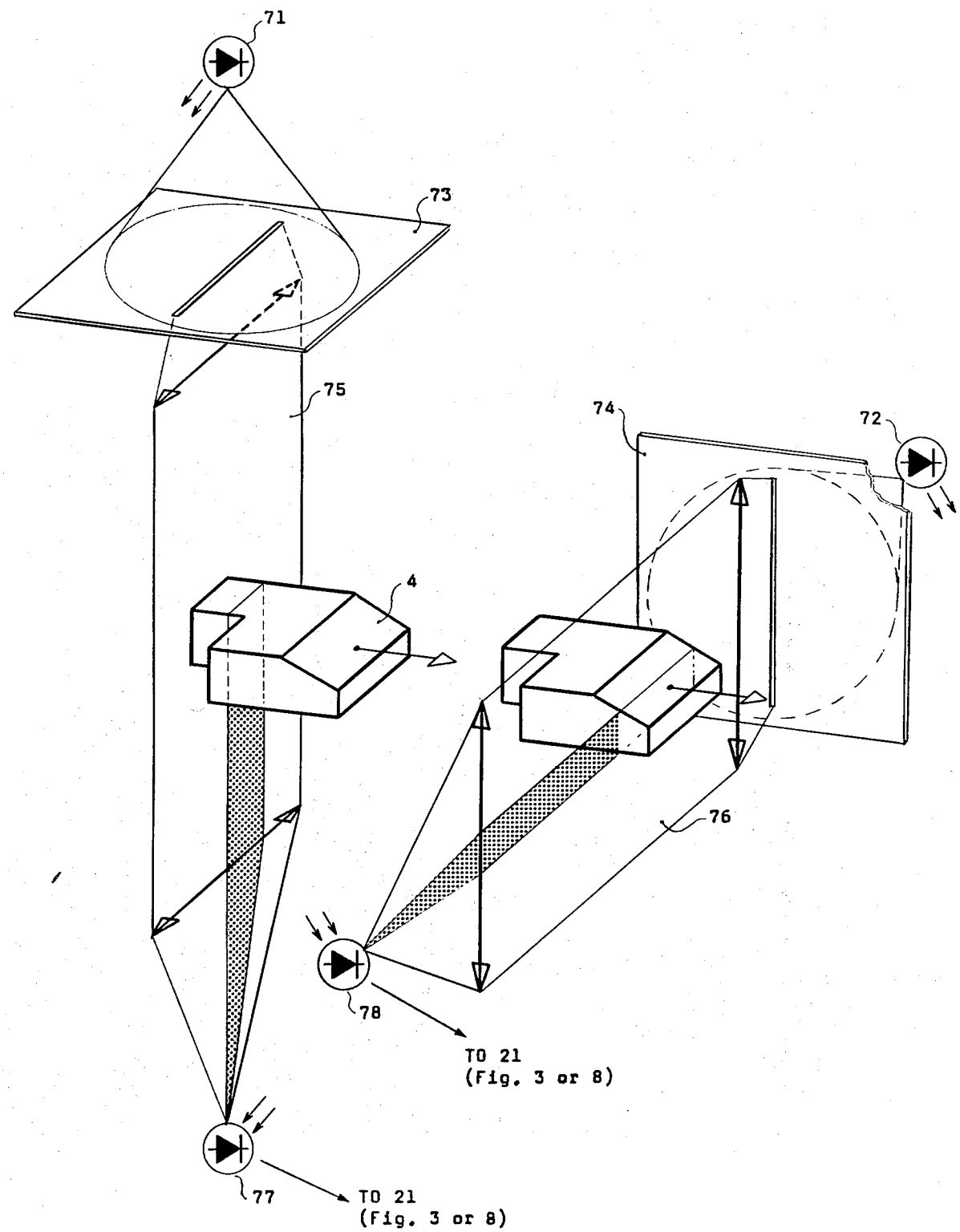
FIG. 7 shows a second embodiment of a system in which two beams of light are used to irradiate a workpiece in two crossed directions.

An arrangement according to FIG. 7 makes it possible to check two contours of a workpiece, in two mutually perpendicular projections.

The signals delivered by the transducers 77 and 78 are processed by two evaluation circuits (FIG. 3 or 8) delivering two final count states, which may be suitably correlated by well-known logical means, not shown in the drawings.

Figure 8:
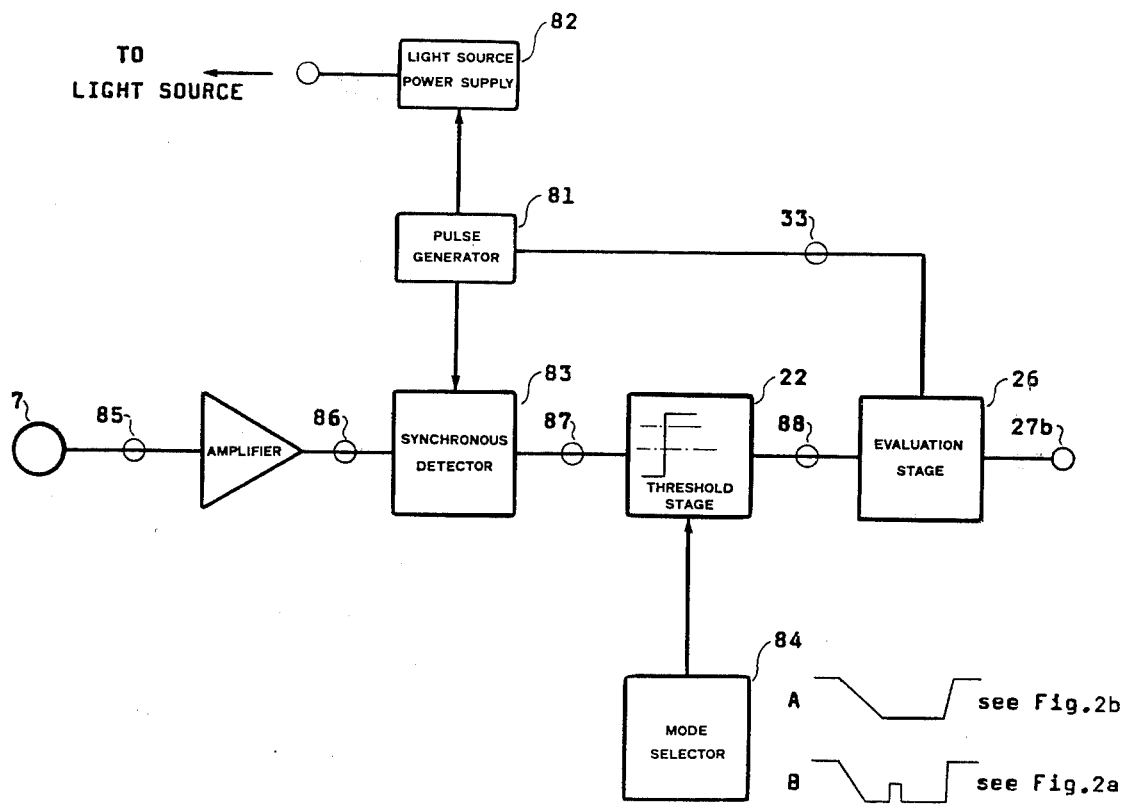
FIG. 8 is a schematic diagram of an embodiment of an evaluation stage used in connection with a light source emitting a pulsed beam of light.

If the light source 1 is pulsed, an evaluation circuit, similar to the circuit shown in FIG. 8 may be used.

In FIG. 8, the signal delivered by the phototransducer 7 is amplified and fed to a synchronous detector 83, which acts like a gate being opened whenever the pulse generator 81 triggers the light source power supply 82 to supply the light source 1 with energy and closed whenever the pulse generator 81 inhibits the power supply 82 to provide the light source with energy. In this manner the terminal 87 will deliver a signal to the threshold stage 22 only when the light source is on. Thus, undesirable effects of straylight due to extraneous light sources can be reduced.

In FIG. 8, the threshold stage 22 is controlled by a mode selector 84, which modifies the logic action of the threshold stage 22.

Considering different types of workpieces or different regions of one workpiece, we notice, that in certain circumstances the crossing of the threshold level in, say, a downward direction, must initiate an upward counting of the counter 30, in other circumstances the same downward crossing of the same threshold level will have to stop the counter and still in other circumstances will initiate a downward counting of the counter 30, or take no action at all. So, for example, if a workpiece 4 delivers a signal according to FIG. 2b, in a first mode A, the counter 30 (FIG. 4) must count upwards between (a) the moment in which the signal crosses the level 13 in a downward direction and (b) the moment when the signal crosses the level 14 downwards, for the first time. Later, when the signal crosses the level 14 upwards, the counter will start counting downwards until the signal reaches the level 13.

In a second mode (B), for example, if the workpiece 4 presents a notch (FIG. 2a) the counter 30 (FIG. 4) will start counting upwards when the signal at terminal 87 crosses the level 10 (FIG. 2a) in a downward direction, for the first time and stops counting when the level 10 is crossed again, but this time, the signal at terminal 87 is increasing. The next downward crossing of level 10 induces a downward count of the counter 30. The counter 30 will stop counting as soon as the level 10 is reached again.

The modes A and B are obviously different, but in both cases, the final count state indicates, for example, which part of an asymmetric workpiece, head or tail, crossed the sheet of light first.

Various changes and modifications may be made, and features described in connection with any one of the embodiments may be used with any of the others, within the scope of the inventive concept.

We claim:

1. Apparatus to test workpieces for size, relative position, material integrity, and the like, comprising
   means (1, 2, 3) including a light source (1) generating and projecting a beam of light (5) on the workpiece (4);
   light receiving and electrical transducer means (7) located in the path of the beam beyond the workpiece, the workpiece being guided between said beam generating and projecting means and the transducer means to interrupt the beam and block the transmission of light to the transducer means;
   and an evaluation circuit (26) connected to said transducer means,
   wherein, in accordance with the invention,
   the beam generating and projecting means includes
   a slit diaphragm (2) located between the source (1) and the transducer (7) and shaped to provide a beam of sheet form for projection unto the workpiece;
   and the evaluation circuit (26) includes
   response means responding to the instantaneous light values received by said transducer means as the workpiece is guided to move through said beam, and evaluating said light values with respect to the movement of the workpiece through said beam including
   light value discriminating means (22) providing output signals representative of light values above and below at least one predetermined level;
   a counter (30) and clock means (33) controlling the count rate of the counter, said counter being controlled by the discriminating means to count in cycles, starting to count when the at least one level is passed and stopping the count when a second predetermined level is passed;
   and count direction control means (31) to control the counter to count in a first direction during a first count cycle and in reverse direction during a succeeding count cycle.

2. Apparatus according to claim 1, wherein the discriminating means includes a threshold stage (22).

3. Apparatus according to claim 2, wherein the threshold stage has two threshold limits and provides a first output signal when the response signal is between first and second limits, and a second output signal when the response signal is beyond said limits;
   and the counter counts in any one cycle between occurrence of the respective first and second output signals.

4. Apparatus according to claim 1, further including a lens (3) located between the light source (1) and the workpiece (4).

5. Apparatus according to claim 1, further including a lens between the workpiece and the transducer means (7).

6. Apparatus according to claim 1, wherein the light source (1) is a light emitting diode (LED).

7. Apparatus according to claim 1, wherein the light source is a laser diode.

8. Apparatus according to claim 1, wherein the transducer means comprises a photo-sensitive semiconductor.

9. Apparatus to test workpieces for orientation, size, relative position, material integrity, and the like, comprising two apparatus according to claim 8, wherein the direction of the slits of the slit diaphragms with respect to each other include an angle other than zero degree.

10. Apparatus according to claim 9, wherein said angle is 90°.

11. Apparatus according to claim 1, wherein the first and second predetermined levels are at the same magnitude, said counter commencing to count when the first predetermined limit is passed and stopping when said same predetermined limit is re-passed.

12. Method of test workpieces for orientation, size, relative position, material integrity, and the like, including the steps of
    irradiating a moving workpiece with a beam of light;
    sensing the instantaneous light values passing around or through the workpiece;
    discriminating the so sensed light values with respect to at least one predetermined level and providing a threshold response output signal when said level is passed upon change of light value;
    controlling a counter to count at a predetermined clock rate only between occurrence of sequential threshold output signals;
    and wherein the step of causing the counter to count includes causing the counter to count, sequentially, first in one count direction and then, in a subsequent cycle, in the reverse count direction;
    whereby the count output will be independent of the speed of movement of the workpiece through the beam of light.

13. Method according to claim 12, wherein the step of causing the counter to count comprises causing the counter to commence counting when a first predetermined light level is passed and terminating counting of the counter when a second predetermined light level is passed.

14. Method according to claim 12, further including the step of evaluating the final difference count which the counter has reached after sequentially counting in opposite directions.

15. Method to test workpieces for orientation, size relative position, material integrity, and the like, comprising
    sequentially carrying out the method of claim 12, and wherein
    the step of generating said beam of light to impinge on the workpiece comprises generating a beam of light in essentially sheet form and, for sequential irradiation upon sequentially carrying out the method of claim 12, the planes of the sheet-formed beam of light are relatively rotated with respect to each other.

16. Method according to claim 15, wherein the relative rotation of the planes of the sheet of light, upon sequentially carrying out the method of claim 15, are rotated relative to each other by 90°.

* * * * *